(12) United States Patent
Olechowski et al.

(10) Patent No.: US 9,242,417 B2
(45) Date of Patent: Jan. 26, 2016

(54) ZIPPER FOR SECURITY BAG AND METHOD OF MANUFACTURE THEREOF

(75) Inventors: Kevin P. Olechowski, Bourbonnais, IL (US); Eric Plourde, Frankfort, IL (US); Robert C. Stolmeier, Shelbyville, IN (US); Kenny E. McCracken, Dacula, GA (US); Lawrence Share, Skokie, IL (US); Owen J. McGarel, Naperville, IL (US); David J. Anzini, Middletown, NY (US); Paul Michael Jenkins, Hendersonville, TN (US); Steven Ausnit, New York, NY (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 770 days.

(21) Appl. No.: 13/032,170

(22) Filed: Feb. 22, 2011

(65) Prior Publication Data

US 2012/0053037 A1 Mar. 1, 2012

Related U.S. Application Data

(60) Provisional application No. 61/329,269, filed on Apr. 29, 2010.

(51) Int. Cl.
*B31B 1/90* (2006.01)
*B29D 5/10* (2006.01)
*B65D 33/20* (2006.01)
(Continued)

(52) U.S. Cl.
CPC *B29D 5/10* (2013.01); *B65D 33/20* (2013.01); *B65D 33/2591* (2013.01); *B65D 33/34* (2013.01)

(58) Field of Classification Search
CPC .... B65D 33/20; B65D 33/2591; B65D 33/34; B29D 5/10
USPC .................................. 493/215, 213, 214, 211
See application file for complete search history.

(56) References Cited

U.S. PATENT DOCUMENTS 4,341,575 A * 7/1982 Herz ................................ 156/66
4,419,159 A * 12/1983 Herrington ...................... 156/66
(Continued)

FOREIGN PATENT DOCUMENTS

EP  0 657 363  6/1995
EP  1 739 024  1/2007
(Continued)

OTHER PUBLICATIONS

International Search Report, PCT Application No. PCT/US11/020734; Jul. 20, 2011.

(Continued)

*Primary Examiner* — Sameh Tawfik
(74) *Attorney, Agent, or Firm* — McCarter & English, LLP (57) ABSTRACT

The disclosure relates to a security zipper and bag, or one-time closable zipper and bag, and methods of manufacture thereof, wherein the zipper includes double zipper profiles with a layer or strip of adhesive positioned between the two interlocking elements of one of the zipper profiles. Upon the one-time closing of the zipper, the adhesive secures the two double zipper profiles together and prevents a subsequent opening of the zipper or bag without leaving evidence of such opening, such as damage to the zipper or bag. Alternately, adhesive can be provided within the female profiles, with a liner over the adhesive to prevent premature activation.

12 Claims, 13 Drawing Sheets

(51) Int. Cl.
*B65D 33/25* (2006.01)
*B65D 33/34* (2006.01)

(56) References Cited

U.S. PATENT DOCUMENTS

| | | | | |
|---|---|---|---|---|
| 4,428,788 | A | * | 1/1984 | Kamp .............................. 156/66 |
| 4,528,224 | A | * | 7/1985 | Ausnit ......................... 428/35.5 |
| 4,601,694 | A | * | 7/1986 | Ausnit ........................... 493/381 |
| 4,682,366 | A | * | 7/1987 | Ausnit et al. ..................... 383/65 |
| 4,691,372 | A | * | 9/1987 | Van Erden ...................... 383/63 |
| 4,744,674 | A | | 5/1988 | Nocek |
| 4,791,710 | A | | 12/1988 | Nocek |
| 4,832,505 | A | | 5/1989 | Ausnit et al. |
| 4,835,835 | A | | 6/1989 | Gould |
| 4,923,701 | A | | 5/1990 | Van Erden |
| 2004/0161178 | A1 | | 8/2004 | Olechowski |
| 2006/0029300 | A1 | | 2/2006 | Yoder |

FOREIGN PATENT DOCUMENTS

| | | |
|---|---|---|
| JP | 7 223657 | 8/1995 |
| JP | 2000 072157 | 3/2000 |
| WO | 2004103840 | 12/2004 |

OTHER PUBLICATIONS

U.S. Appl. No. 12/951,664, filed Nov. 22, 2010, Anzini et al.

* cited by examiner

ZIPPER FOR SECURITY BAG AND METHOD OF MANUFACTURE THEREOF

This application claims priority under 35 U.S.C. §119(e) of provisional patent application Ser. No. 61/329,269, filed on Apr. 29, 2010, the contents of which are hereby incorporated by reference in their entirety.

BACKGROUND OF THE DISCLOSURE

1. Field of the Disclosure

The present disclosure relates to a zipper for a security bag and the method of manufacture thereof. Examples of uses of the security bag include, but are not limited to, money transfers for banks and ATM companies, identification and storage of criminal evidence, and identification and storage of medical specimens.

2. Description of the Prior Art

In the prior art, tamper or pilferage evident bags or containers are desired for many applications including, but are not limited to, money transfers for banks and ATM companies, identification and storage of criminal evidence, and identification and storage of medical specimens. These bags, containers or flexible packages typically are designed to be closed a single (once and only once) time and are intended to have several characteristics. Firstly, after the package is closed, it is intended that the package cannot be re-opened without obvious damage to the package. Secondly, it is intended that it is virtually impossible to re-open the package through the original package opening. Thirdly, it is intended that the package is sealed well enough that covert pilferage of the contents is difficult, if not impossible.

While much of the prior art has been generally satisfactory for its intended purposes, further improvements are sought in achieving the above goal, especially in view of the following. Firstly, security bags that use only an adhesive closure can sometimes be re-opened by freezing the adhesive to temperatures as low as negative 40 degrees Fahrenheit. At the low temperatures, the adhesive loses its adhesive properties and the bag can be opened, the contents pilfered from the bag, and once the adhesive returns to room temperature, the bag can be reclosed using the adhesive. Secondly, some zipper profiles for security bags can be made from rigid material making them difficult to open. However, this may sometimes be defeated by heating the zipper profile in order to soften the zipper profiles. Thirdly, some zippers for security bags may be susceptible to certain tools. For example, one may use a small screwdriver or a piece of wire and work it between the zipper profiles to pry them apart and allow access to the contents of the security bag.

Commonly assigned patent application Ser. No. 12/951,664 entitled "Zippered Security Bag" filed on Nov. 22, 2010 by Anzini et al. relates to a zippered security bag.

Prior art includes U.S. Pat. No. 4,923,701 entitled "Zippered Cook-in-Bag Pouch and Method" issued on May 8, 1990 to Van Erden; U.S. Pat. No. 4,835,835 entitled "Method and Apparatus for Making Extruded Separable Fastener with Reactivatable Adhesive" issued on Jun. 6, 1989 to Gould; U.S. Pat. No. 4,791,710 entitled "Self-Aligning Closable Extruded Profile Plastic Fastener and Method" issued on Dec. 20, 1988 to Nocek; and U.S. Pat. No. 4,744,674 entitled "Non-Reclosable mechanically Fillable and Closable Link Bag Structure and Method" issued on May 17, 1988 to Nocek.

SUMMARY AND OBJECTS OF THE DISCLOSURE

It is therefore an object of the present disclosure to provide a zipper, and method of manufacture thereof, for a security bag or container which is tamper or pilferage evident.

It is therefore a further object of the present disclosure to provide a zipper, and method of manufacture thereof, for a security bag or container, which reduces or eliminates the ability of a malefactor to compromise the security of the zipper by application of heat or cold, or by the use of tools or other implements.

These and other objects are attained by the present disclosure by providing a one-time closable zipper, for a security bag or container, which typically uses zipper profiles (which may be double zipper profiles) which are configured to be difficult to separate and may be made from polypropylene, resulting in zipper profiles which are difficult to re-open and which are typically not susceptible to significant softening in response to heating. Additionally, the zipper profiles are placed on a base web adjacent to an area where an adhesive enhancer and an adhesive are coated. The adhesive may be colored or configured in a colored pattern so that attempts to open the zipper would likely leave a stress pattern in the adhesive. The present disclosure further relates to the method for making such zippers.

BRIEF DESCRIPTION OF THE DRAWINGS

Further objects and advantages of the disclosure will become apparent from the following description and from the accompanying drawings, wherein.

DETAILED DESCRIPTION OF THE PREFERRED EMBODIMENTS

Figure 1:
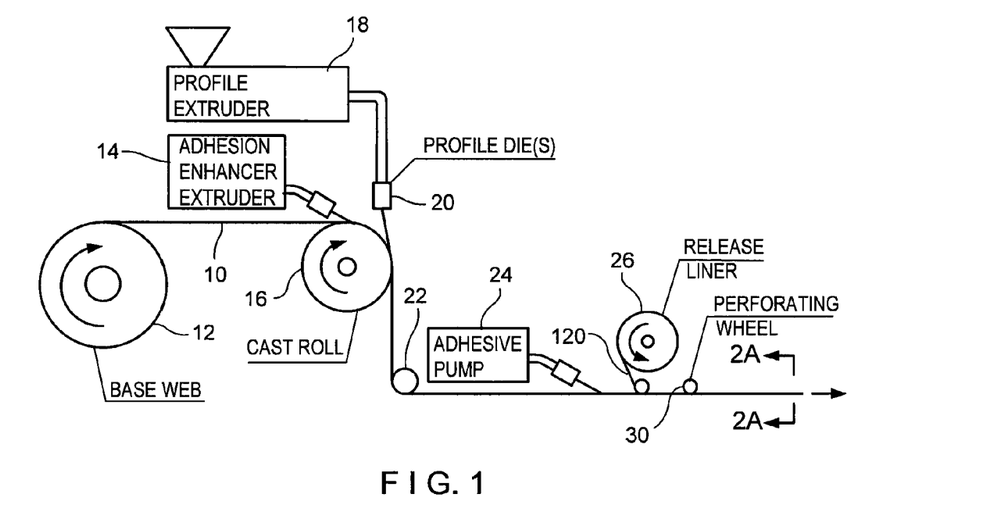
FIG. 1 is a schematic of a first method for manufacturing a security zipper of the present disclosure.
Figure 2A:
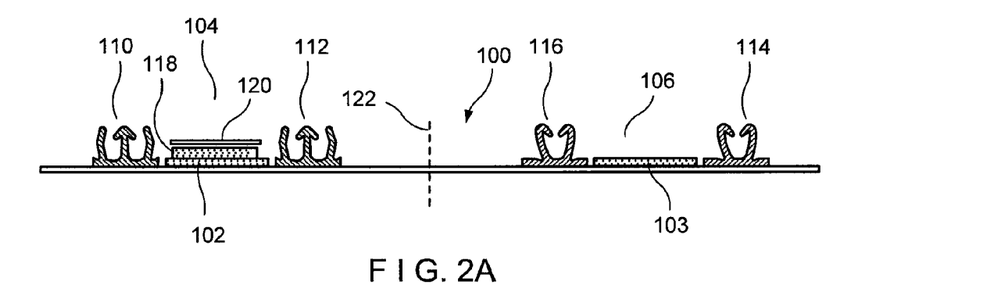
FIG. 2A is a cross-sectional view along plane 2A-2A of FIG. 1, as well as FIGS. 3, 4 and 14, showing a cross-sectional view of a security zipper of the present disclosure.
Figure 2B:
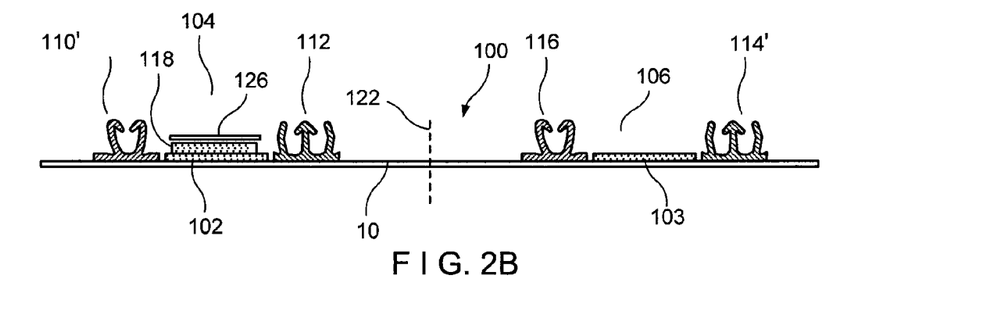
FIG. 2B is an alternative cross-sectional view along plane 2A-2A of FIG. 1, as well as FIGS. 3, 4 and 14, showing a cross-sectional view of a security zipper of the present disclosure.

Referring now to the drawings in detail wherein like numerals indicate like elements throughout the several views, one sees that FIG. 1 is a schematic of a first method for producing a security zipper (or one-time closable zipper) 100 of the present disclosure. A base web 10 is unwound from a roll 12. The base web 10 is typically polymeric material and can be produced by such methods as, but not limited to, extrusion, lamination or similar methods. More specifically, the base web 10 may be made from, but is not limited to, polyethylene (such as metallocene linear low density polyethylene, low density polyethylene, linear low density polyethylene, medium density polyethylene and high density polyethylene, the meaning of these terms being known to those skilled in the art), nylon, polyester, or similar materials, or blends, co-extrusions or laminations thereof. An adhesive enhancer extruder 14 is used to extrusion coat strips 102, 103 of base web 10 with an adhesion enhancer (see FIGS. 2A and 2B) onto and in the area that will eventually be joined together by an adhesive. These areas are bounded on either side by interlocking elements. This extrusion is typically performed when the base web 10 is supported by cast roll 16. The heat generated by the extrusion coating typically permanently fuses the adhesive enhancer to the base web 10. The adhesion enhancer is a material that shows great affinity for adhesives. When an adhesive contacts the adhesion enhancer, it becomes extremely difficult to separate the two under normal conditions. Typical adhesive enhancers include, but are not limited to, adhesive resins such as Admer brand resins (e.g., SE 800, a modified polyolefin or ethylene maleic anhydride) produced by Mitsui and Bynel brand materials (acid or anhydride modified ethylene vinyl acetates and/or acid or anhydride modified ethylene acrylates) produced by DuPont. Other examples could include ethylene acrylic acid copolymers, such as those manufactured by Dow under the tradename Primacor. Profile extruder 18 extrudes zipper profile material (such as, but not limited to, polypropylene, or the materials listed above for the base web) through profile dies 20 to form first and second double zipper profiles 104, 106 (see FIG. 2) on web base 10, likewise supported by a portion of cast roll 16, adjacent to both sides of, or straddling, the areas of strips 102, 103 of adhesive enhancer (see FIG. 2). While a large number of zipper profile shapes may be used, it has been found that the male/female wedge zipper profile shapes shown in FIGS. 9 and 10, and described in greater detail hereinafter, are particularly advantageous in that it is virtually impossible to re-open the zipper profiles without causing obvious damage to zipper 100 or the security bag 400 (see FIG. 11). FIG. 2A discloses a typical arrangement for a double zipper (security zipper 100) wherein first and second male interlocking elements 110, 112 are formed on first double zipper profile 104, on both sides of strip 102 of adhesive enhancer, and corresponding first and second female interlocking elements 114, 116 are formed on a second double zipper profile 106, on both sides of strip 103 of adhesive enhancer. Alternatively, as shown in FIG. 2B (wherein the genders of interlocking elements 110' and 114' have been changed with respect to respective interlocking elements 110 and 114 of FIG. 2A), each double zipper profile 104, 106 could include a male interlocking element and a female interlocking element, configured so that the male interlocking element of the first double zipper profile can interlock with the female interlocking element of the second double zipper profile and the male interlocking element of the second double zipper profile can interlock with the female interlocking element of the first double zipper profile. In the finished security bag 400 (see FIG. 11), first double zipper profile 104 is intended to be joined to the first wall of a security bag and second double zipper profile 106 is intended to be joined to the second wall of a security bag.

Returning to FIG. 1, one sees that, alternatively, the profile extruder 18 and profile dies 20 may be replaced with a roll of pre-made zipper profiles (not shown) which are heat sealed or otherwise joined to base web 10.

The orientation of base web 10 may be changed by one or more idler wheels 22, as required by the particular application. An adhesive melt pump 24, typically including an application nozzle, applies a layer 118 of adhesive to strip 102 of adhesive enhancer (see FIG. 2). The adhesive can be applied in a thin sheet, in one or more beads or in a pattern. The adhesive may be colored so that attempts to open the finished and sealed security bag result in signs of stress in the adhesive. Providing strips of different color adhesive or adhesive enhancer next to each other could further enhance this tamper or pilferage evident feature. The layer of adhesive 118 can be applied on one or both of strips 102, 103 of adhesive enhancer (i.e., between male interlocking elements 110, 112 on first double zipper profile 104 and/or between female interlocking elements 114, 116 on a second double zipper profile 106). Many pressure sensitive adhesives (PSAs) that provide high bond strength to the adhesion enhancer and further provide high cohesive strength can be used for layer 118 of adhesive. However, Collano's T2 2049 rubber-based adhesive has proven to work well for this application. Alternatively, when a two-sided adhesive tape is desired, JDC (John Deal Coatings) B-550, which is a rubber-based double faced pressure sensitive tape on a PET center carrier, has been found to be very satisfactory.

A release liner 120, typically made from a paper or polymer product, is provided from roll 26 and placed over layer 118 of adhesive to protect the adhesive and to prevent the adhesive from prematurely adhering to another surface. Two sheets of release liner 120 are typically required if adhesive is provided over both strips 102, 103 of adhesive enhancer. The release liner 120 typically does not extend into the side seals of the security bag (see, for example, FIG. 11) Similarly, if beads or patterns of adhesive have been applied, the release liner 120 can be used to press down, spread out, and flatten the adhesive before the adhesive has cooled and solidified. If desired, a line of perforations 122 (see FIGS. 2A and 2B) can be formed between the zipper halves by perforating wheel 30, or by a similar method. Alternatively, the two halves can be severed from each other. The zipper 10 is then typically wound onto a spool (not shown) as is, or it can be folded and wound unmated, or folded and wound with one or both sets of profiles mated. If desired, the base web 10 can be printed at any point. Additionally, the zipper 10 may be provided directly to a method and apparatus for the manufacture of the security bags.

Figure 3:
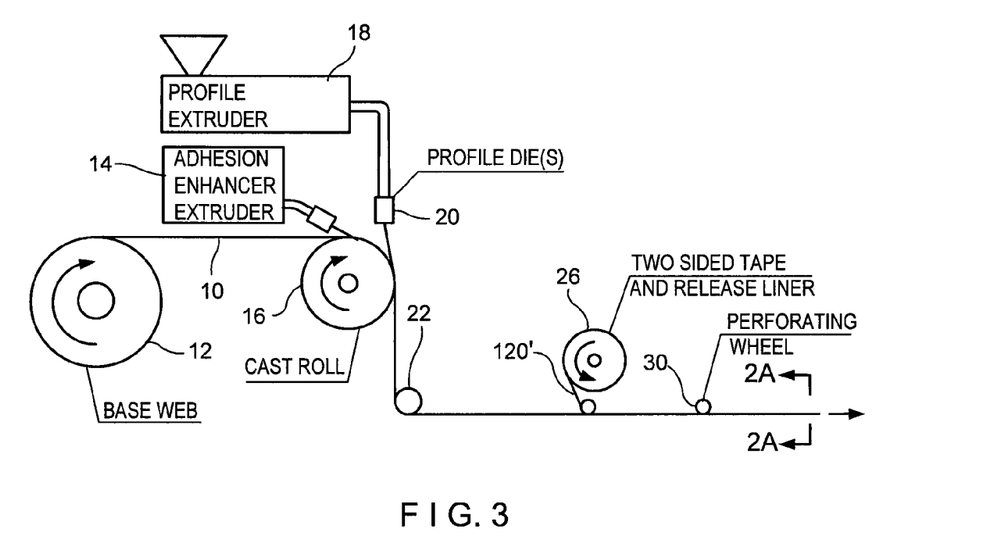
FIG. 3 is a schematic of a second method for manufacturing the security zipper of the present disclosure.

FIG. 3 is a schematic of a second method for producing a security zipper 100 of the present disclosure. In FIG. 3, roll 26 dispenses a two-sided tape and release liner 120' in lieu of release liner 120. This further eliminates the adhesive melt pump 24 of FIG. 1. The two-sided tape and release liner 120' can be made from an unsupported strip of adhesive, or a core material can be coated on both sides with similar, or dissimilar, adhesives. The resulting cross section is very similar to that shown in FIGS. 2A and 2B.

Figure 4:
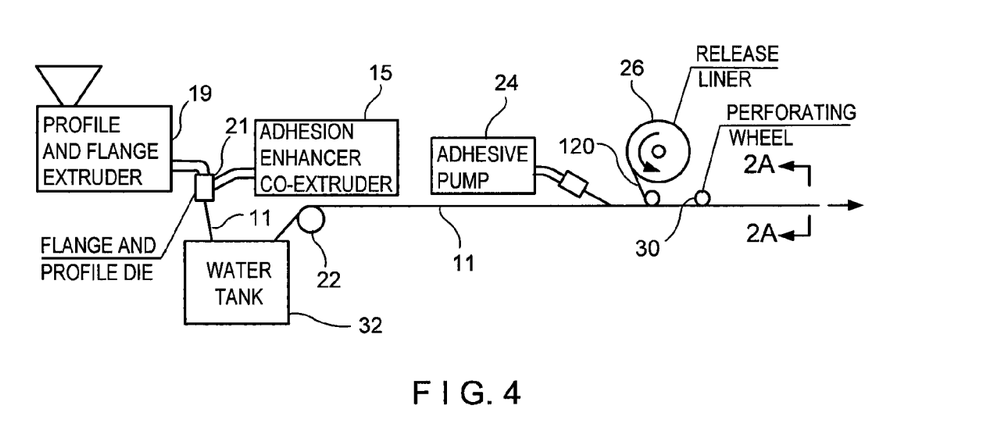
FIG. 4 is a schematic of a third method for manufacturing the security zipper of the present disclosure.

FIG. 4 is a schematic of a third method for producing a security zipper 100 of the present disclosure. In FIG. 4, a zipper extrusion 11 is used in place of base web 10. Profile and flange extruder 19 integrally extrudes the zipper extrusion 11 with the first and second double zipper profiles 104, 106 formed thereon through flange and profile die 21. Adhesion enhancer co-extruder 15 extrudes the strips 102, 103 of adhesion enhancer onto zipper flange extrusion 11. Other materials for sealants, color lines, etc. could also be co-extruded onto zipper extrusion 11. The zipper extrusion 11 is typically at an elevated temperature due to the extrusion processes. The zipper extrusion 11 is typically cooled in water tank 32. Adhesive melt pump 24, roll 26 of release liner 120 and perforating wheel 30 are provided similarly to the embodiment of FIG. 1. Moreover, in this embodiment and other embodiments, the adhesive melt pump 24 and roll 26 of release liner 120 may be replaced with double-sided adhesive tape with a liner. If the zipper extrusion 11 and zipper profiles 104, 106 are formed from polypropylene, typically a localized sealant will be used to enhance the attachment of the zipper flange to the film of the security bag (see FIG. 11).

Figure 5:
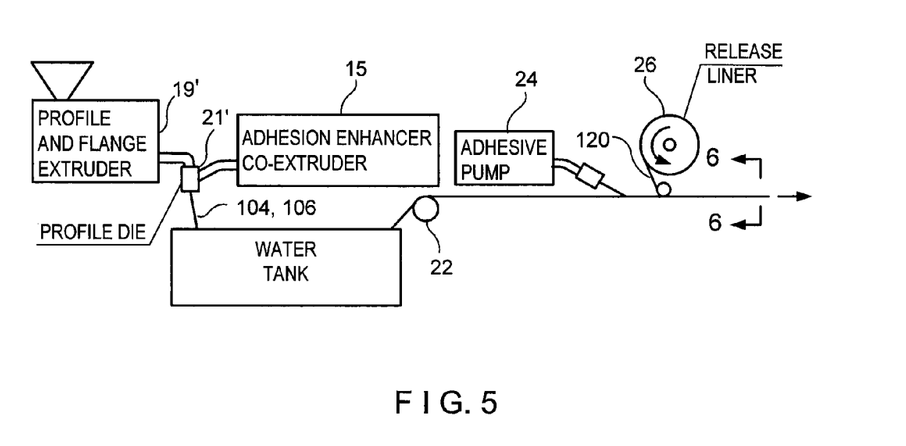
FIG. 5 is a schematic of a fourth method for manufacturing the security zipper of the present disclosure.
Figure 6:
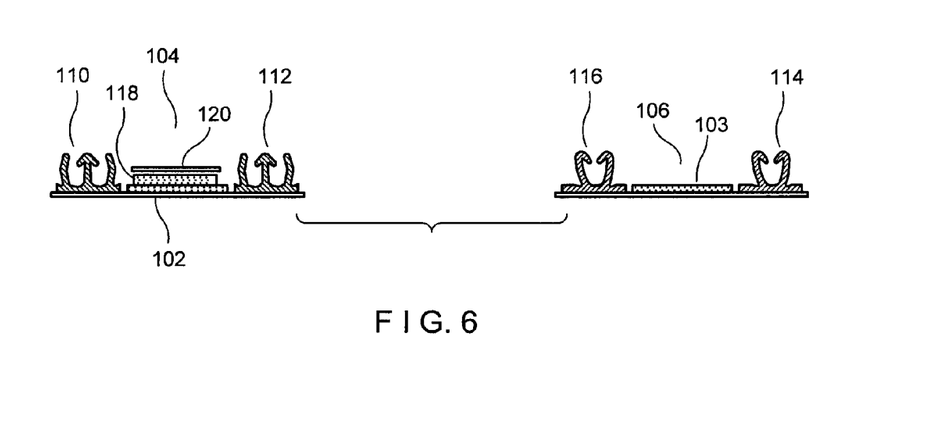
FIG. 6 is a cross-sectional view along plane 6-6 of FIG. 5, showing a cross-sectional view of a security zipper of the present disclosure.

FIG. 5 is a schematic of a fourth method for producing a security zipper 100 of the present disclosure. The method of FIG. 5 is similar to that of FIG. 4 except that the security zipper 100 is flangeless (see FIG. 6) so that the profile extruder 19' extrudes only the first and second double zipper profiles 104, 106 and the flange is omitted (see FIG. 6). A sealant layer may be additionally co-extruded in order to attach the security zipper 100 to the bag film.

Figure 7:
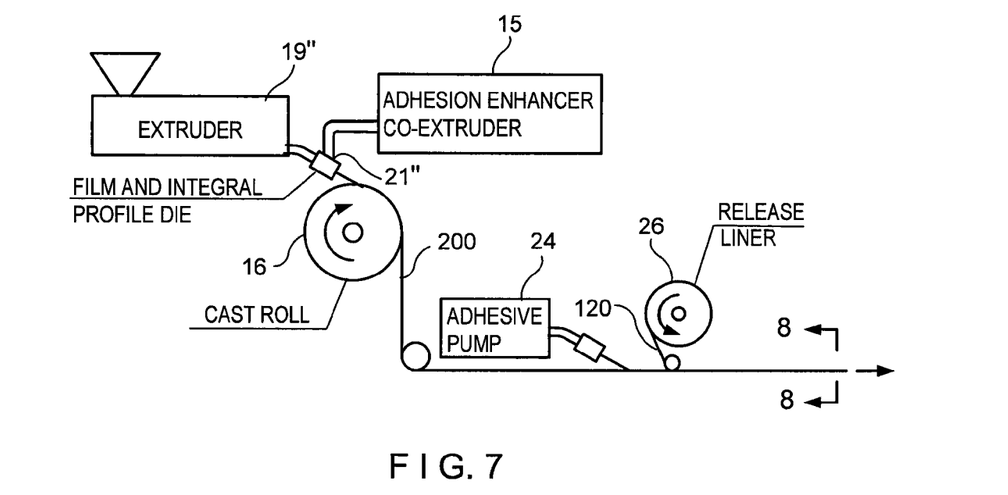
FIG. 7 is a schematic of a fifth method for manufacturing the security zipper of the present disclosure.
Figure 8:
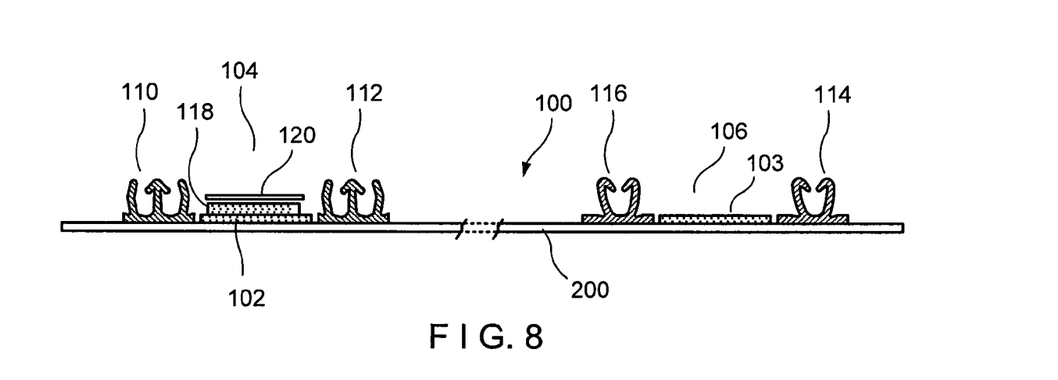
FIG. 8 is a cross-sectional view along plane 8-8 of FIG. 7, showing a cross-sectional view of a security zipper of the present disclosure.

FIG. 7 is a schematic of a fifth method for producing a security zipper 100 of the present disclosure. Film and integral profile extruder 19" integrally extrudes the bag film 200 and first and second double zipper profiles 104, 106 through film and integral profile die 21'. Similar to the embodiments of prior figures, adhesion enhancer coextruder 15 is used to extrusion coat strips 102, 103 with an adhesion enhancer (see FIG. 8) onto the bag film in areas between the interlocking elements of the double zipper that eventually will be joined together by adhesive. This extrusion is typically performed when the base web 10 is supported by cast roll 16. Idler wheel 22, adhesive melt pump 24 and roll 26 of release liner 120 are provided similarly to the embodiment of FIG. 1. The profiles could also be extruded onto the cast film just downstream of the cast film die, which is similar to the first method described above, but where the roll of the base film is replaced by the cast film. Alternately, an integral blown film process could be used, the blown film process typically producing tougher film than the cast process.

Figure 9:
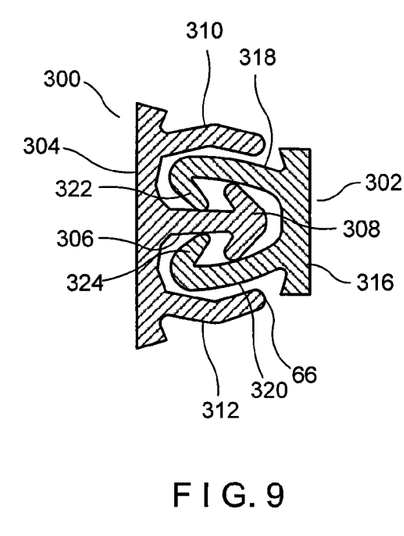
FIG. 9 is a cross-sectional view of typical male and female interlocking elements used in a security zipper of the present disclosure.
Figure 10:
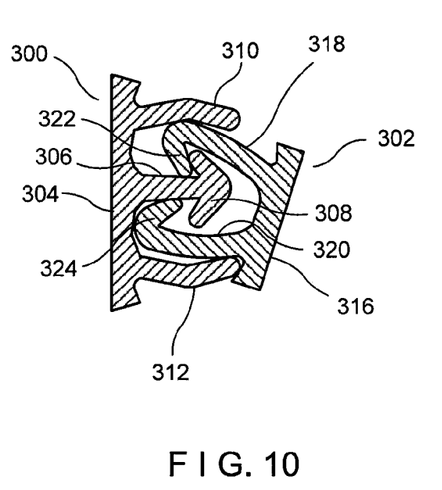
FIG. 10 is a cross-sectional view of the typical male and female interlocking elements of FIG. 9, illustrating how these elements are resistant to opening or separating when rotated or twisted with respect to each other.

FIG. 9 shows a cross-sectional view of a typical male interlocking element 300 and female interlocking element 302, as would be typically used for male interlocking elements 110, 112 and female interlocking elements 114, 116, respectively. Male interlocking element 300 includes a base 304 with male element 306 extending therefrom, terminating in arrowhead shaped element 308. First and second arcuate wings 310, 312 are formed on opposite adjacent sides of male element 306. Female interlocking element 302 includes base 316 with first and second arms 318, 320 extending therefrom, terminating in respective first and second hook elements 322, 324. In the interlocked configuration, first arm 318 of female interlocking element 302 extends between first arcuate wing 310 and male element 306 of male interlocking element 300 so that first hook element 322 engages a first side of arrowhead shaped element 308. Similarly, second arm 320 of female interlocking element 302 extends between second arcuate wing 312 and male element 306 of male interlocking element 300 so that second hook element 324 engages a second side of arrowhead shaped element 308. As shown in FIG. 10, if the male and female interlocking elements 300, 302 are rotated or twisted with respect to each other, the end of one of first and second arcuate wings 310, 312 serves a wedge point, engaging against base 316 of female interlocking element 302, preventing further relative rotation, and maintaining the interlocked configuration of male and female interlocking elements 300, 302.

Figure 11:
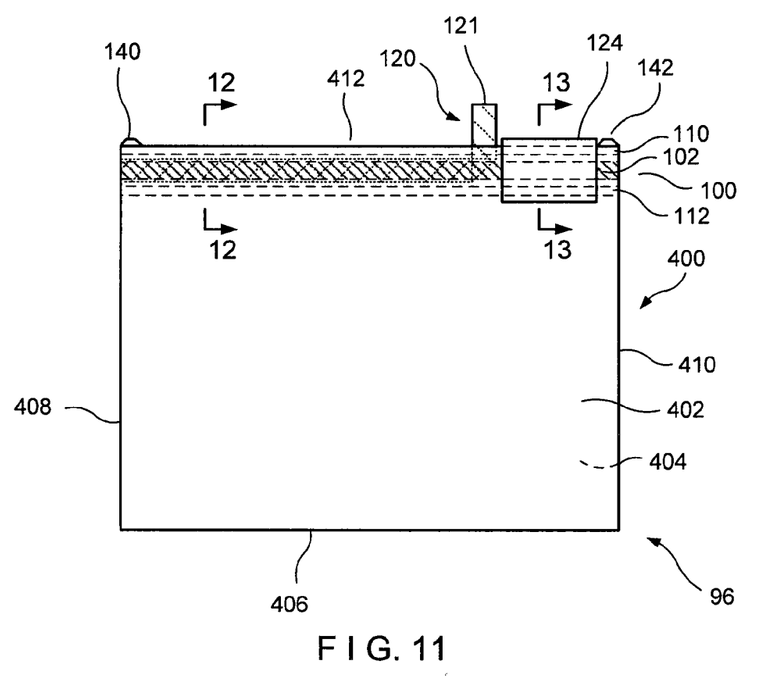
FIG. 11 is a plan view of an embodiment of the security bag of the present disclosure.
Figure 12:
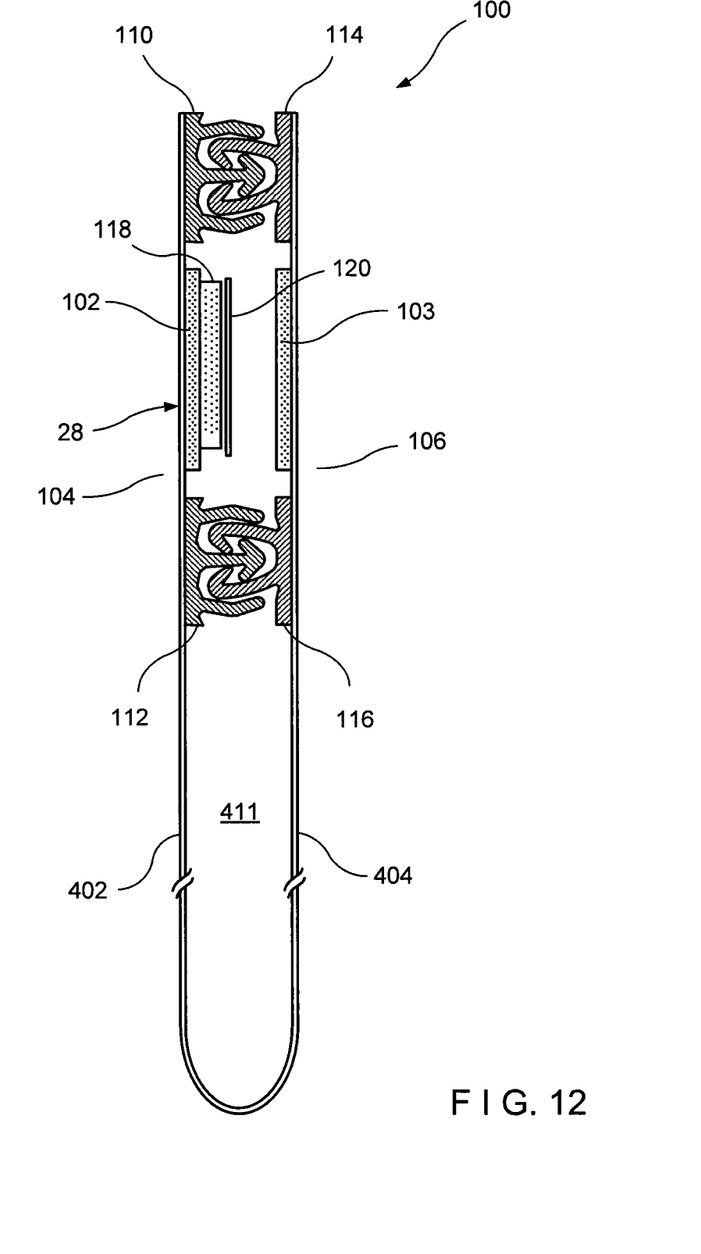
FIG. 12 is a cross-sectional view along plane 12-12 of FIG. 11.
Figure 13:
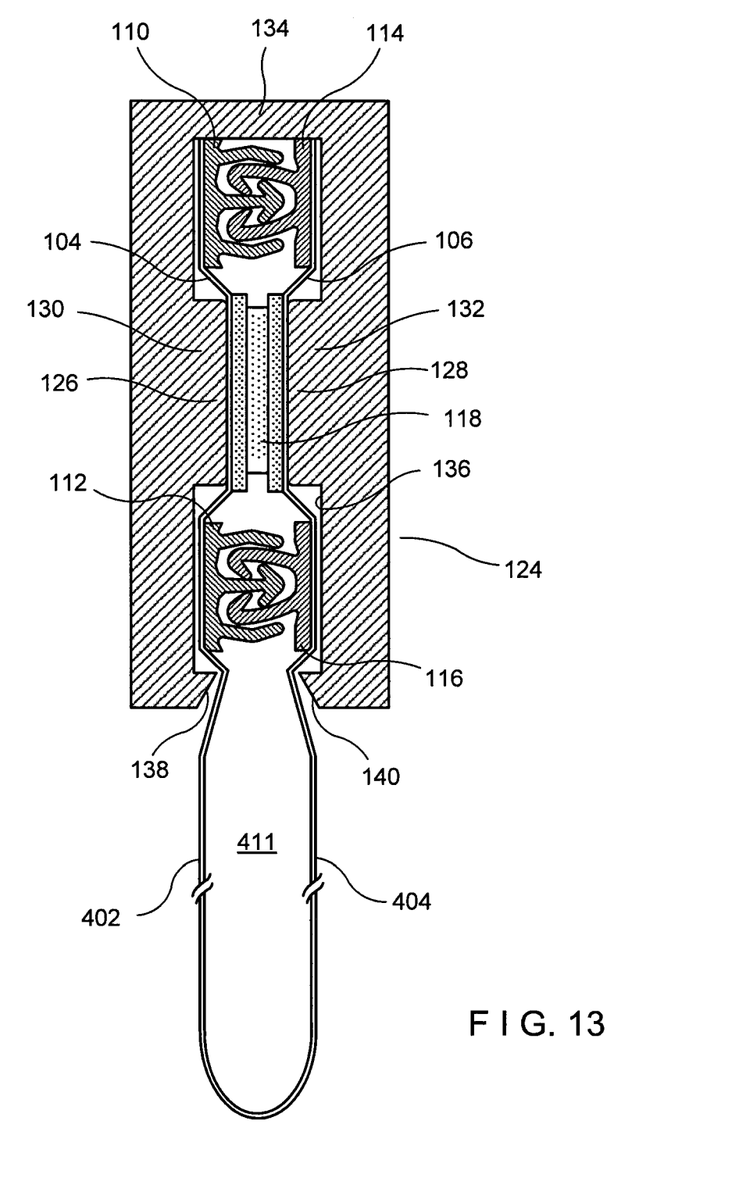
FIG. 13 is a cross-sectional view along plane 13-13 of FIG. 11.

FIG. 11 shows finished security bag (or one-time closable bag or package) 400. Security bag 400 includes front and rear polymeric walls 402, 404 (typically made from bag film 200, such as is illustrated in FIG. 7), joined together at bottom seal 406 (which may be replaced by a fold) and first and second side seals 408, 410 thereby defining a storage space 411 (see FIGS. 12 and 13). The upper mouth 412 of security bag 400 is closed by security zipper 100 after the contents have been inserted and the one-time closability feature is desired. The release liner 120 is typically folded at an angle so that a loose end 121 projects above the top of the security bag 400 for easy access by the user. FIG. 12 is a cross-sectional view of zipper 10, typically achieved by facing the first and second zipper profiles 104, 106 of FIGS. 2A and 2B toward each other. As shown in FIG. 11, zipper 100 includes first and second endstops 140, 142 to constrain the movement of slider 124. As shown in FIG. 13, slider 124 includes first and second walls 126, 128 with respective first and second interior pressure bars 130, 132, thereby forming upper and lower chambers 134, 136. Upper chamber 134 engages interlocked male and female interlocking elements 110, 114 while lower chamber engages interlocked male and female interlocking elements 112, 116. First and second walls 126, 128 terminate in respective first and second inwardly oriented rails 138, 140 to maintain interlocked male and female interlocking elements 112, 116 therein. The portions of zipper 100 including adhesive 118 are engaged between pressure bars 130, 132, so that when the release liner 120 is removed from zipper 100, the movement of slider 124 pushes the first and second double zipper profiles 104, 106 together so that the adhesive 118 joins together the first and second double zipper profiles 104, 106. Pressure bars 130, 132 may have a fixed gap between them, or may be cantilevered to maintain constant pressure therebetween. The slider 124 may be omitted and the double zipper profiles 104, 106 can be urged together manually to form the adhesive engagement.

Figure 14:
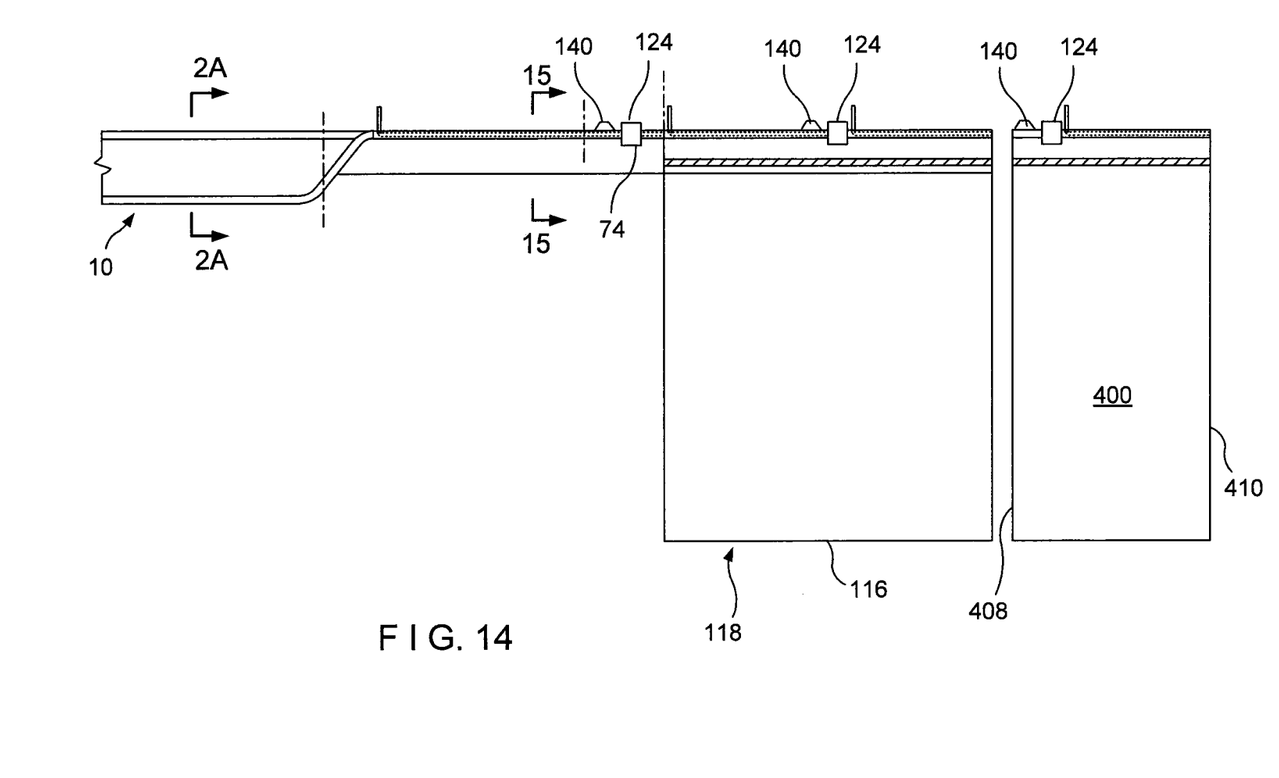
FIG. 14 is a plan view illustrating the method and process of assembly of a security bag of the present disclosure.
Figure 15:
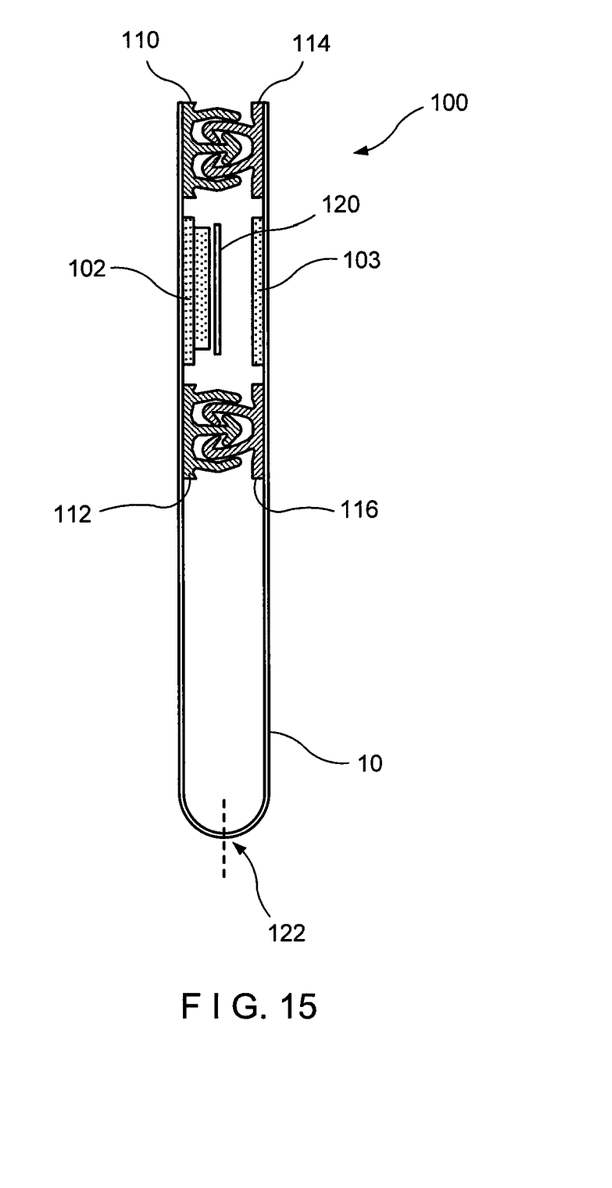
FIG. 15 is a cross-sectional view along plane 15-15 of FIG. 14.

A method of manufacture of security bag 400 is illustrated in FIG. 14. An unmated zipper 100, with a cross section similar to that shown in FIG. 2A or 2B) is fed from the left on FIG. 14 and folded into a U-shape resulting in the cross section shown in FIG. 15 (alternately, the zipper 100 may be fed as two separate halves or slit and one half flipped next to the other half). Portions of the release liner 120 are removed so that the release liner 120 will not extend into the side seals 408, 410. The release liner can be punched out where the side seals will be, or the release liner can be cut into segments which are shorter than the width of the finished security bag, or preferably it can be cut into segments and a portion folded at an angle so that it will project above the top of the zipper when the security bag is completed (see FIG. 11). The release liner 120 is then re-applied to the adhesive. The first and second zipper profiles 104, 106 are mated in the area that will become the sides of the security bag 400 while leaving the rest of the profiles unmated. Slider endstops 140, 142 are created by crushing the upper zipper profiles, or are attached by other known methods. Endstops are typically created straddling where the bag side seals will be, resulting in an endstop 140, 142 at each side of the bag and keeping the slider 124 from coming off of either side of the bag 400. Sometimes, endstop 142 may be omitted in that the slider 124 loses its functionality after the zipper 100 has been closed. Slider 124 is inserted onto the zipper. If the first and second double zipper profiles 104, 106 are still joined by perforations 122, perforations 122 can be broken or left intact for the bag user to break. Alternately, if perforations 122 have not been formed, the base web 10 can be slit. Bag webs are introduced and attached to the lower portions of the zipper 100. The bag web is typically heat sealed or otherwise joined (such as by, but not limited to, ultrasonic, adhesive or other bonding methods) to the lower portion of the zipper 10. Side seals 408, 410 are then formed, typically by a hot knife seal which cuts and fuses the sides of a leading bag and a trailing bag (or by similar methods), or discrete side seals can be made on each side of the bag and the bag severed from the web and zipper by a separate blade, or a side seal can be made and the bags separated by cutting through the middle of the seal. As shown in FIGS. 26-31, the release liner 120 extends beyond the adhesive strip which it covers and between the tracks of the outward-facing zipper 100. The upper track of the outside zipper is then peeled back (see FIG. 28). Thereafter, to create the cut-outs, a separating plate 802 is provided that separates the liner 120 from the adhesive strip (see FIG. 29). The separating plate 802 should be at a sufficient distance from the adhesive strip and/or has to have a bottom facing surface that is lined or coated with a substance to which the adhesive will not attach itself. To create the cut-out, a shaped knife 804 or punch acting against the plate cuts out an inverted U-shaped section 814 on the liner of a width slightly larger than the front and back seal of the required bags, that is indexed to the location of the bag side seals. At the same time, perforations 808 are created in the uncut area of the liner that are in-line with the cross-seals. Thereafter, the outside zipper upper track is returned to its former position (see similarities of FIGS. 27 and 30 to each other, wherein the zipper is constrained by notched rollers 810, 812, respectively). This process can take place at or in front of the bag machine or at an earlier stage, as long as provision can be made to index the cut-out section's position to the bag side seals. If the process takes place at the bag machine, the zipper is then sealed to the bag sides, and the cross-seals made at the cut-out locations to form the bag. To load the bag, the upper tracks of the double zipper are separated, the bag is loaded, the releasable liner is grasped adjacent to the perforations and removed, and the double zipper is press-closed, manually or by a slider so that the adhesive strip is thereby activated.

Figures 16, 17, 18, 19, 20, 21:
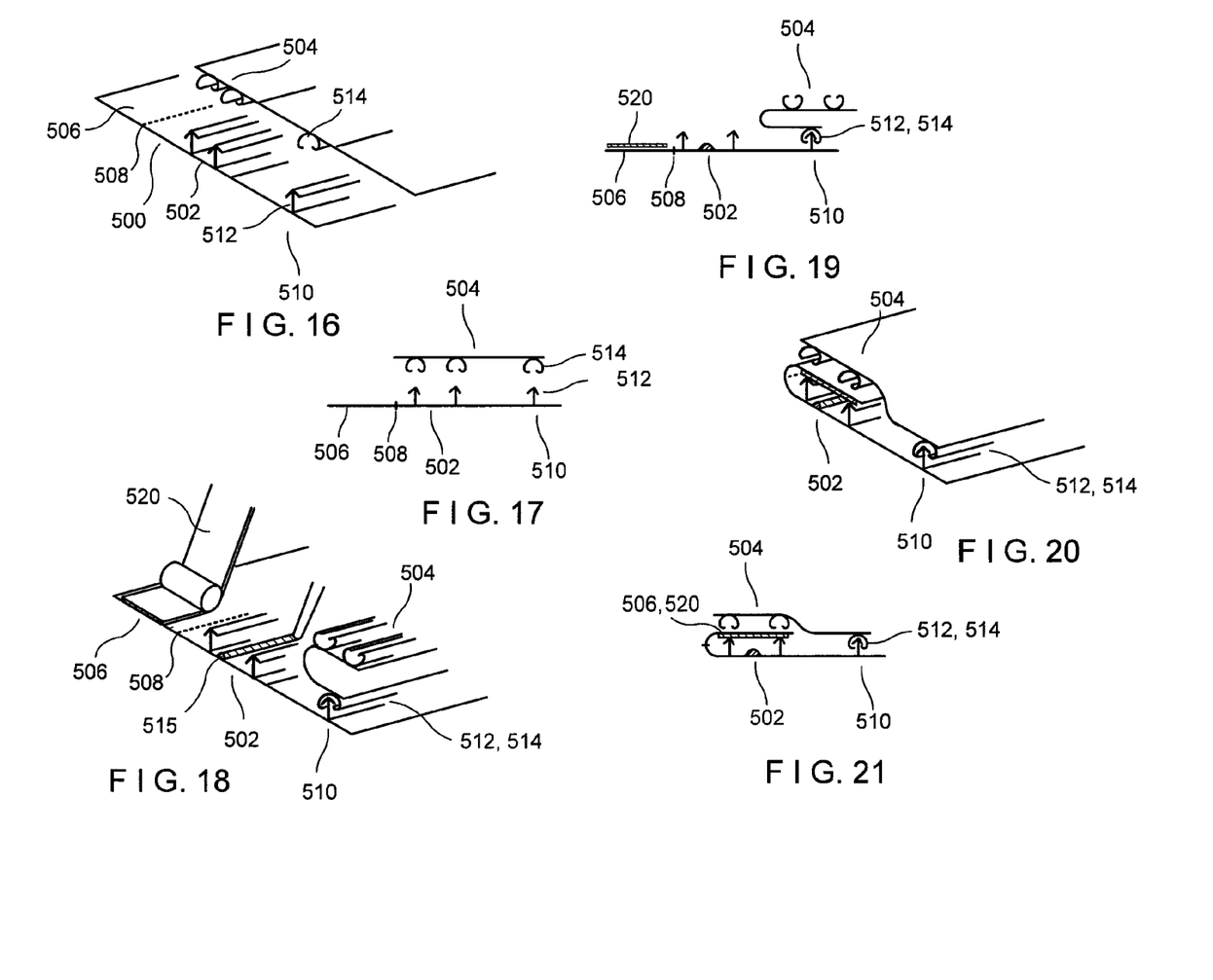
FIG. 16 is a perspective view a first step of the construction of a further embodiment of the security zipper of the present disclosure.
FIG. 17 is a cross-sectional view of FIG. 16.
FIG. 18 is a perspective view of a second step of the construction of a further embodiment of the security zipper of the present disclosure.
FIG. 19 is a cross-sectional view of FIG. 18.
FIG. 20 is a perspective view of a third step of the construction of a further embodiment of the security zipper of the present disclosure.
FIG. 21 is a cross-sectional view of FIG. 20.
Figure 22:
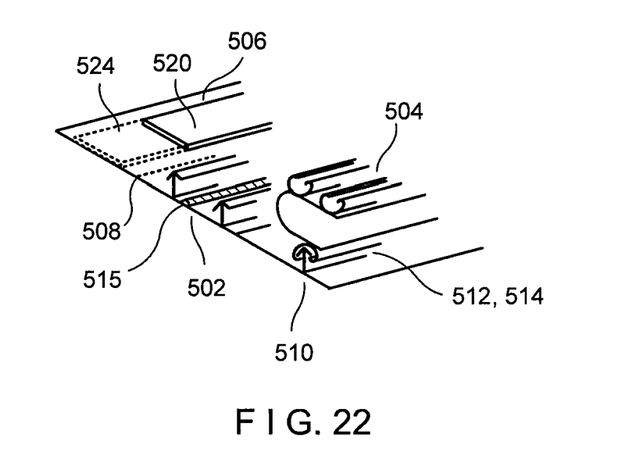
FIG. 22 is a perspective view of a fourth step of the construction of a further embodiment of the security zipper of the present disclosure.

Another method of keeping the release liner 120 from the side seals 408, 410 is illustrated in FIGS. 16-22 indicating a further aspect of the present disclosure to accomplish this. FIGS. 16 and 17 illustrate a first step wherein first and second interlocking profiles 502, 504 of a double zipper 500 are provided and first profile includes an extended flange 506 attached by perforated line 508. A third zipper 510 with first and second interlocking profiles 512, 514 maintains the double zipper 500 in alignment when first and second profiles 502, 504 are not interlocked. As shown in FIGS. 18 and 19, the first and second profiles 504 are unfolded over third zipper 510. A releasable tape with adhesive on one side has its adhesive side applied to the extended flange 506 while the flange is in an extended position, while also an adhesive bead is applied between first and second profiles 502. At the same time, perforations 508 are applied to the extended flange adjacent to the outer profile, after which the extended flange 506 is folded over the first and second profiles 502. Thereafter, the first and second profiles 504 are folded back over first and second profiles 502, as shown in FIG. 20. The zipper is then wound for deliver to a bag machine. At the bag machine, profiles 504 and extended flange 506 are again unfolded to their position in FIG. 19, and sections of extended flange 506 are again unfolded to their position in FIG. 19, and sections of extended flange 506, equivalent to a slightly great distance than two side seals of the bags required for the finished bags, are cut out or punched out, with the cut-outs 524 being indexed to the positions of the bag seals. If the cut-outs 524 are made at the bag machine, the first step of folding and unfolding may be omitted. Because the releasable tape has been cut out at the side seal locations, the side seals will extend over the profiles 502, 504 and seal these together. The security bag is now ready for use. To use the bag, the first and second profiles 504 are again folded back over zipper 510, which is now also separated. The bag is now loaded, the releasable tape and extended flange 506 beyond the perforations is unfolded to its extended position, where it can be readily grasped and torn off along the perforation line, leaving the adhesive bead 515 exposed. The profiles 502, 504 are then pressed together either manually or by a slider so that the adhesive bead between profiles 502 is activated and will prevent profiles 502, 504 from being disengaged without evidence of tampering.

Figure 23:
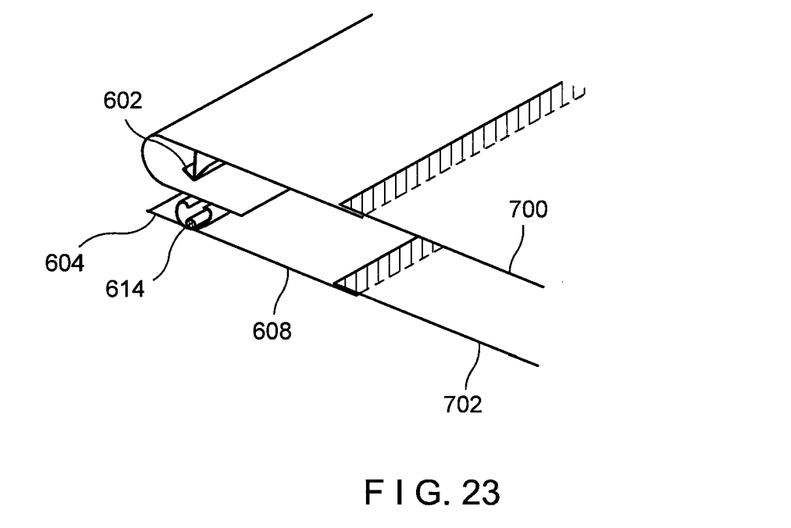
FIG. 23 is a perspective view of a still further embodiment of the security zipper of the present disclosure.
Figure 24:
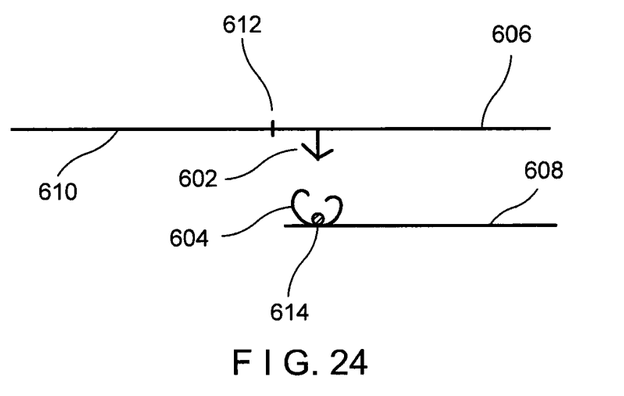
FIG. 24 is a cross-sectional view of a first step of construction of a still further embodiment of the security zipper of the present disclosure.
Figure 25:
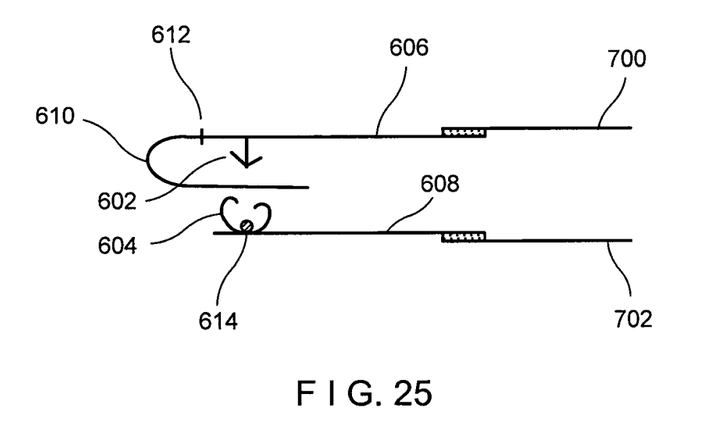
FIG. 25 is a cross-sectional view of a second step of construction of still further embodiment of the security zipper of the present disclosure.
Figure 26:
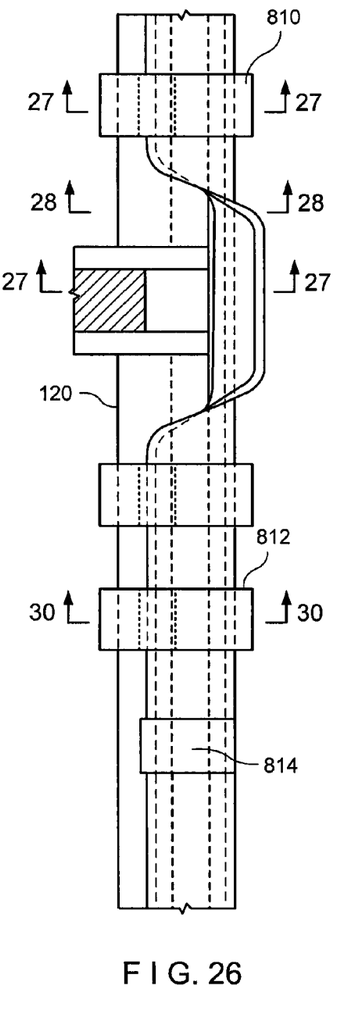
FIG. 26 is a plan view of apparatus for removing release liner from sections of the web which will subsequently form the side seals of the bag of the present disclosure.
Figure 27:
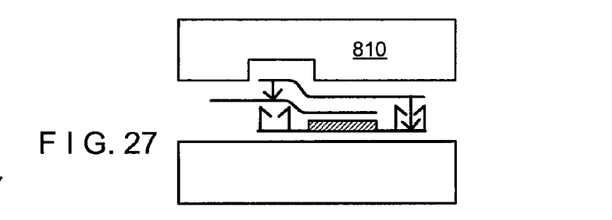
FIG. 27 is a cross-sectional view along plane 27-27 of FIG. 26.
Figure 28:
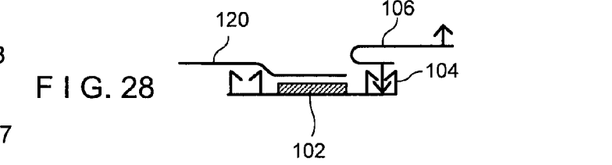
FIG. 28 is a cross-sectional view along plane 28-28 of FIG. 26.
Figure 29:
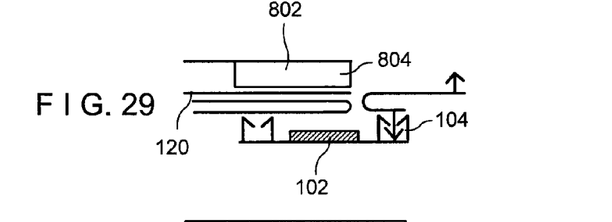
FIG. 29 is a cross-sectional view along plane 29-29 of FIG. 26.
Figure 30:
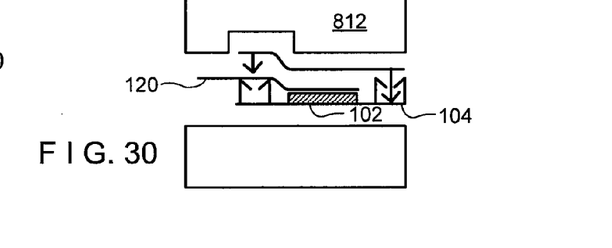
FIG. 30 is a cross-sectional view along plane 30-30 of FIG. 26.
Figure 31:
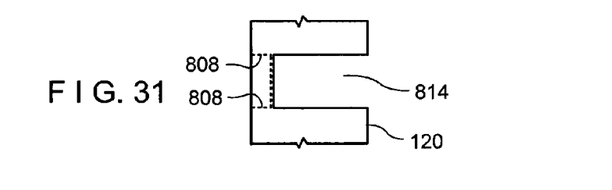
FIG. 31 is a perspective view of the cut-out of FIG. 26.

FIGS. 23, 24 and 25 illustrate a still further embodiment of the zipper 600 wherein a male interlocking element 602 and a complementary female interlocking element 604 are provided on respective first and second flanges 606, 608. As shown in FIG. 25, first and second flanges 606, 608 are provided for attachment to first and second bag walls 700, 702. First flange 606 further includes extended lip 610 connected thereto via tear line or perforated line 612. Adhesive 614 is added inside female interlocking element 604 after extrusion of female interlocking element. After the bag is made and cut-outs provided for the bag side seals as previously described and then filled, extended lip 610 is removed by tearing along line 612, the male and female interlocking elements 602, 604 are joined and pressure is applied (such as, but not limited to, by rollers) so as to engage adhesive 614, resulting in a permanent joinder, adhesion or seal. If required a double zipper can be used, and the adhesive 614 can be added inside of both female interlocking profiles and/or between the profiles.

Thus the several aforementioned objects are most effectively attained. Although preferred embodiments of the invention have been disclosed and described in detail herein, it should be understood that this invention is in no sense limited thereby and its scope is to be determined by that of the appended claims.

What is claimed is:

1. A method of manufacturing a one-time closable zipper comprising the steps of:
   providing a length of film;
   extruding a zipper onto the length of film, including a first zipper profile and a second zipper profile, wherein the first zipper profile includes a first interlocking element and a second interlocking element with a first area between the first interlocking element and the second interlocking element and the second zipper profile includes a third interlocking element and a fourth interlocking element with a second area between the third interlocking element and the fourth interlocking element;
   extruding a first layer of adhesion enhancer to the first area;
   extruding a second layer of adhesion enhancer to the second area;
   applying a layer of adhesive over the first layer of adhesion enhancer within the first area, wherein the adhesive is of a material different from that of the adhesive enhancer, wherein the first interlocking element is interlockable with the third interlocking element, the second interlocking element is interlockable with the fourth interlocking element, and the first zipper profile is adhesively secureable by the layer of adhesive within the first area to the second area of the second zipper profile, thereby providing one-time closure tamper evidence.

2. The method of claim 1 wherein the first and second interlocking elements are male elements and the third and fourth interlocking elements are female elements.

3. The method of claim 1 wherein the first and fourth interlocking elements are male elements and the second and third interlocking elements are female elements.

4. The method of claim 1 wherein the adhesion enhancer is a modified polyolefin.

5. The method of claim 1 wherein the adhesion enhancer is a modified ethylene vinyl acetate.

6. The method of claim 1 wherein the adhesive is rubber-based.

7. The method of claim 1 including the step of applying a liner on the layer of adhesive, wherein the liner is removed prior to adhesively securing the first zipper profile to the second zipper profile.

8. The method of claim 1 wherein the first, second, third and fourth interlocking elements are made from polypropylene.

9. The method of manufacturing a one-time closable zipper of claim 1 wherein the step of extruding a zipper onto the length of film further includes the step of extruding a flange with the zipper.

10. The method of claim 9 including the step of placing the flange and zipper into a liquid cooling tank after the step of extruding the flange with a zipper.

11. The method of claim 1 wherein the first area includes a layer of adhesion enhancer, wherein the layer of adhesive is applied over the layer of adhesion enhancer.

12. The method of claim 1 including the step of applying a liner on the layer of adhesive, wherein the liner is removed prior to adhesively securing the first zipper profile to the second zipper profile.

* * * * *